Patented Nov. 17, 1953

2,659,655

UNITED STATES PATENT OFFICE 2,659,655

PRODUCTION OF FLUORIDE-FREE URANIUM OXIDE

Roger G. Sweet, Bexley, Ohio, assignor, by mesne assignments, to Union Carbide and Carbon Corporation, a corporation of New York No Drawing. Application March 12, 1949, Serial No. 82,481

2 Claims. (Cl. 23—14.5)

This invention relates to a method for precipitating uranium compounds from aqueous solutions thereof. In particular it relates to a method for obtaining fluorine-free uranium compounds from fluorine-containing uranium compounds.

According to the invention, an ammonium fluoride, such as $NH_4F$, is added to an aqueous solution of uranium oxyfluoride ($UO_2F_2$) to precipitate uranium from the solution in the form of the double fluoride salt ($3NH_4F.UO_2F_2$). This precipitate is crystalline and granular in nature, settles quickly and is easily filtered. It is not dusty when dry which facilitates handling of the compound.

The invention is also applicable to the precipitation of the complex salt of ammonium fluoride and uranium oxyfluoride by means of ammonium fluoride when the aqueous solution of uranium oxyfluoride being treated contains hydrofluoric acid in solution. Such solutions are encountered in practice when uranium hexafluoride is dissolved in water, the following hydrolysis reaction then taking place:

(1) $UF_6 + 2H_2O \rightarrow UO_2F_2 + 4HF$

The ammonium fluoride used as the precipitating agent may be either ammonium fluoride itself, $NH_4F$, or the ammonium acid fluoride $NH_4.HF$. In the first instance, the reaction which occurs on precipitation may be represented as follows:

(2) $3NH_4F + UO_2F_2 \rightarrow 3NH_4F.UO_2F_2$

When the ammonium acid fluoride is employed the reaction is quite similar:

(3) $3NH_4F.HF + UO_2F_2 \rightarrow 3NH_4F.UO_2F_2 + HF$

When an ammonium fluoride precipitating agent is employed, the recovery of the uranium from solution as the double fluoride salt is practically quantitative, an excess of the precipitant being preferable for best results. As an illustration, 35 parts by weight of uranium hexafluoride were dissolved in 65 parts of water to form a nearly saturated solution of uranium oxyfluoride and hydrofluoric acid. Then various amounts of ammonium fluoride and ammonium acid fluorides were added and the amount of uranium precipitated from solution determined. The results are tabulated below:

| Precipitant | Molar Ratio Precipitant Used to $UO_2F_2$ in Solution | Percent Uranium Precipitated as $3NH_4F.UO_2F_2$ |
|---|---|---|
| $NH_4F$ | 3 | 99.5 |
| $NH_4F$ | 9 | 99.99 |
| $NH_4F$ | 12 | 99.99 |
| $NH_4F.HF$ | 12 | 99.5 |

To obtain a fluorine-free uranium compound from the precipitated double fluoride of ammonium fluoride and uranium oxyfluoride, the granular precipitate is filtered. It is then heated with steam to a point at or above its decomposition temperature, which is about 600° C. The double fluoride decomposes forming urano-uranic oxide, $U_3O_8$, ammonium fluoride and hydrofluoric acid. The vapors from the calcination may be treated to recover the ammonium fluoride and hydrofluoric acid by scrubbing with water. The scrubbing liquid is then combined with the filtrate from the filtered double fluoride salt and evaporated to remove the hydrofluoric acid. The evaporation may be carried to a point where either a concentrated solution of the salts ($NH_4F$ or $NH_4F.HF$) is obtained or the solid salts themselves isolated. In either case, the precipitating agent is recovered for re-use in the process.

The cyclic process outlined above has the advantage that there is no loss of uranium as only water and hydrofluoric acid are removed from the system. Furthermore, no reagents are consumed in the process; only a small amount of ammonia being added to the system from time to time to compensate for incidental losses.

Modification of the invention other than as described above will be apparent to chemists, and are included within the scope of the invention as defined in the claims.

What is claimed is:

1. Process for obtaining urano-uranic oxide which comprises forming a concentrated aqueous solution of uranium oxyfluoride, adding one of the group consisting of ammonium fluoride and ammonium acid fluoride to said solution in an amount in excess of three moles per mole of uranium oxyfluoride present in said solution, forming a granular, easily filtered precipitate of the double fluoride salt ($3NH_4F.UO_2F_2$), said precipitate containing at least 99.5% of the uranium originally present as uranium oxyfluoride in said solution, separating said precipitate and calcining it in the presence of steam to form urano-uranic oxide substantially free of fluorides.

2. Cyclic process for recovering a fluoride-free uranium oxide from uranium hexafluoride, which comprises dissolving the uranium hexafluoride in water to form a concentrated aqueous solution of uranium oxyfluoride, adding more than three moles of an ammonium fluoride to said solution per mole of uranium oxyfluoride present in said solution, forming a granular, easily filtered precipitate of the double fluoride salt ($3NH_4.UO_2F_2$), said precipitate containing at least 99.5% of the uranium originally present as uranium oxyfluoride in said solution, separating said precipitate and calcining it in the presence of steam to form ammonium fluoride, hydrogen fluoride and urano-uranic oxide substantially free of fluorides, and recovering the ammonium fluoride formed in said calcining operation for re-use in the precipitation step.

ROGER G. SWEET.

References Cited in the file of this patent

UNITED STATES PATENTS

| Number | Name | Date |
|---|---|---|
| 2,339,685 | De Simo | Jan. 18, 1944 |

OTHER REFERENCES

Friend, Textbook of Inorganic Chemistry, vol. VII, part III, p. 293 (1926). Published by Charles Griffin and Company, Ltd., London. Copy in Scientific Library.

Bolton, Bulletin de la Societe Chimique, New Series, vol. VI, 2nd semestre, pp. 450-451 (1866). Copy in Scientific Library.

Baker, Journal of the Chemical Society, New Series, vol. 35, pp. 767 and 768 (1879). Copy in Scientific Library.